Oct. 28, 1952     A. E. REEVES     2,615,664
CAMERA MOUNT
Filed Aug. 27, 1945                        2 SHEETS—SHEET 1
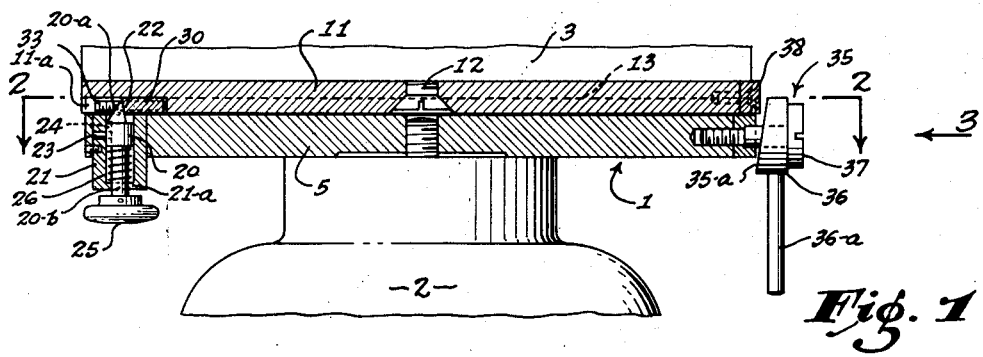
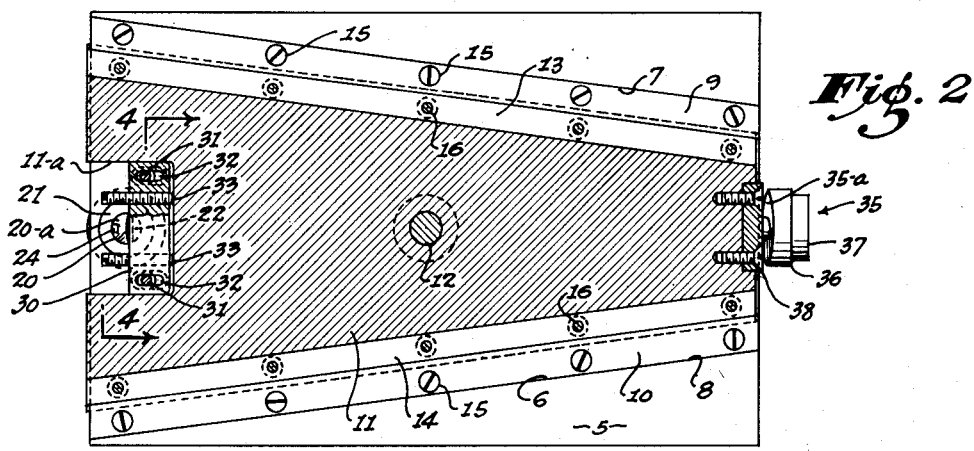
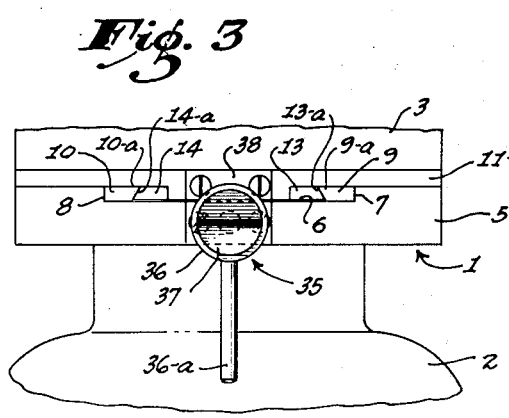
INVENTOR
Arthur E. Reeves
BY John Flann
ATTORNEY Oct. 28, 1952     A. E. REEVES     2,615,664
CAMERA MOUNT
Filed Aug. 27, 1945     2 SHEETS—SHEET 2
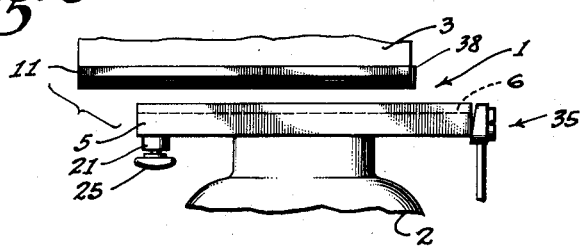
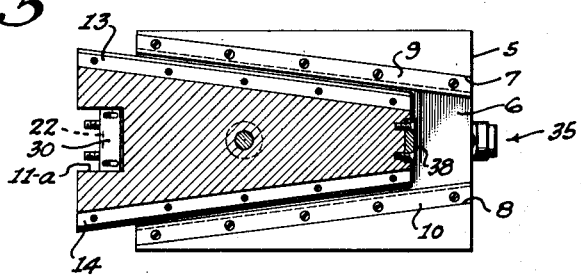
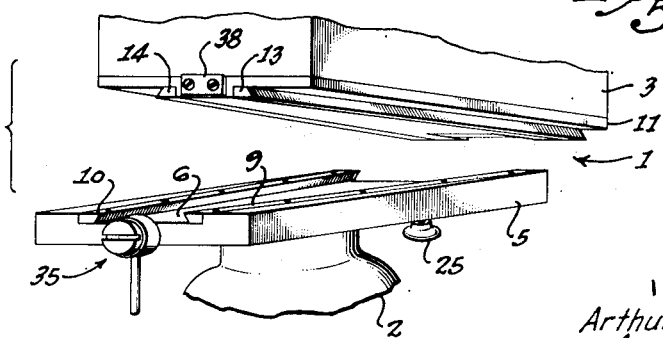
INVENTOR
Arthur E. Reeves
BY John Flann
ATTORNEY Patented Oct. 28, 1952

2,615,664

UNITED STATES PATENT OFFICE 2,615,664

CAMERA MOUNT

Arthur E. Reeves, Los Angeles, Calif.

Application August 27, 1945, Serial No. 612,803

6 Claims. (Cl. 248—177)

This invention relates to mounting means; and, particularly, to means by which a device, such as a motion picture camera, may be detachably secured to a supporting tripod having a tiltable head.

It is an object of this invention to make it possible easily to attach a device, as a camera, in position on the support in a secure and firm manner, and which permits quick and easy removal of the camera when desirable.

It is another object of this invention to provide tapering guides for slidably receiving cooperating parts of the camera, and means restraining the camera against removal which also serve to hold the camera tightly in the guides.

In Patent 2,375,690, granted to Arthur E. Reeves on May 8, 1945, entitled "Tripod Head," a camera mount of this type is disclosed. It is another object of this invention to improve in general such camera mounts.

It is still another object of this invention to provide such a camera mount having means for positively freeing the camera from the guides.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

In the drawing:

Figure 1 is a longitudinal section of a mounting embodying the invention, shown in use;

Fig. 2 is a horizontal section, taken as indicated by line 2—2 of Fig. 1;

Fig. 3 is an elevation taken from the right in Fig. 1;

Fig. 4 is a detail section, taken as indicated by line 4—4 of Fig. 2;

Fig. 5 is an elevation on a reduced scale, showing the mounting disconnected, as when the camera is detached from the tripod;

Fig. 6 is a section similar to Fig. 2, but on a reduced scale and showing the mounting disconnected; and Fig. 1 is a pictorial view of the mounting in the condition illustrated in Figs. 5 and 6.

In Fig. 1 the mounting means is generally indicated by the numeral 1, and is shown as attached to a support 2, which may be the tiltable head of a camera tripod, for detachably securing apparatus 3, such as a camera, to the head 2.

The mounting means 1 comprises a flat rectangular table-like member 5, provided on its upper face with a recess 6 having converging sides 7 and 8 which are provided with guide flanges or liners 9 and 10. These flanges have overhanging upper edges 9–a and 10–a, and cooperate to form a dovetailed tapering slot for receiving corresponding surfaces provided on the bottom of the camera 3. These surfaces may be formed integrally on the camera 3, or they may be formed, as shown, on a plate 11 secured to the camera by a large countersunk screw 12.

The edges of the plate 11 are inclined at the same angle as the surfaces 7 and 8 of the member 5, and are shown as provided with detachable strips 13 and 14, undercut, as at 13–a and 14–a, to engage respectively the overhanging portions 9–a and 10–a of the guide flanges 9 and 10.

By providing separate guide flanges 9 and 10 and strips 13 and 14, the wedging surfaces may be conveniently formed of suitable wear-resisting material. The guide flanges 9 and 10 are secured to the member 1 by countersunk screws 15. The wear strips 13 and 14 are similarly secured to the plate 11 by screws 16.

Movement of the camera 3 and plate 11 toward the right in Fig. 2 causes the plate 11 to wedge in the dovetailed slot formed by the guides 9 and 10, the undercut portions 13–a and 14–a engaging the overhanging edges 9–a and 10–a. The camera is thus firmly secured to the tripod head 2. At the same time, a comparatively small movement toward the left (Fig. 2) will serve to free the plate 11 completely from the dovetailed slot, so that the camera may be removed, as illustrated in Figs. 5 and 6.

It is desirable to lock the camera 3 in wedging relation to the member 5. For this purpose a spring-pressed pin or detent 20 is provided, guided for movement to project above the surface of the member by a sleeve 21 suitably secured in the member 5. The detent 20 has a head 20–a with an inclined cam surface thereon adapted to engage an abutment 22 on the plate 11, and is restrained against rotation in the sleeve 21 as by a key 23 slidably engaging a slot 24. The pin 20 has a reduced portion or stem 20–b projecting below the sleeve 21 and carrying a knob 25, a compression spring 26 being interposed between the head 20–a and a shoulder 21–a formed in the sleeve 21 (see Fig. 1). The parts are so proportioned that upward urging of the pin 20 by the spring 26, by engagement of the inclined surface 20–a with the abutment 22, constantly urges the plate 11 toward the right (Figs. 1 and 2) and maintains the plate 11 in wedging relation with the dovetailed slot in the member 5.

To provide a compact structure, the abutment 22 is accommodated in a recess 11–a in the plate 11. Furthermore, to avoid the necessity of extremely close tolerances and to permit compensation for wear of the parts, the abutment 22 is made adjustable with respect to plate 11. Thus, the abutment 22 is formed in a bar 30 of appropriate wear-resisting material adjustably secured within the recess 11-a by screws 31 passing through slotted holes 32 in the bar 30 and threaded into the plate 11. Adjustment screws 33 are threaded through the bar 30 in the direction of the thrust and engage the back surface of the recess 11-a. These screws 33 serve to transmit the force exerted in the abutment 22 by the pin 20 to the plate, and by adjustment to alter the position of the abutment with respect to the plate 11.

When it is desired to remove the camera 3 from the member 5, pin 20 is retracted beneath the surface of the member 5 by means of the knob 25, and the camera 3 and plate 11 are moved to the left sufficiently to disengage the plate 11 from the overhanging edges 9-a and 10-a. The camera then may be lifted from the member 5. To facilitate movement of the plate 11 out of wedging relation with the member 1, means 35 are provided having a cam surface 35-a facing oppositely of the cam surface on pin 20. Thus, means 35 may be conveniently a cylindrical cam 36 rotatably mounted on that end of the member 5 opposite to that carrying the pin 20, as by a shoulder screw 37 threaded into the member 5. The cam surface 35-a faces the member 5 and extends above the upper surface of the member 5 so as to engage the plate 11, an operating handle 36-a being provided on the cam. A wear-resisting plate 38, secured to the plate 11, forms an abutment for cooperating with the cam 36.

The parts are so proportioned that, when the plate 11 is wedged in the dovetailed slot on the member 5, the abutment 38 projects beyond the end of the member 5 so as to be engaged by the cam surface 35-a upon rotation of the cam 36. By rotating the cam 36, a force urging the plate 11 toward the left may be exerted. Thus, by retracting the pin 20 to clear the plate 11, and rotating the cam 36 through about a half turn from the position shown, the plate 11 is moved to the left sufficiently to free it from wedging relation with the member 5.

The inventor claims:

1. In a support for a camera, or the like, a table-like member, flanges fixed to said member and converging toward an end of the member to form a guide, said flanges having overhanging edges, a restraining means guided for movement to project above the member and resiliently urged to project above the member, said restraining means having a locking surface for engaging and urging an element slidable in said guide toward said end and into wedging relationship with the flanges, and releasing means for urging said element out of wedging relation mounted on said member adjacent said end.

2. In a support for a camera, or the like, a table-like member, flanges fixed to said member and converging toward an end of the member to form a guide, said flanges having overhanging edges, a restraining means guided for movement to project above the member and resiliently urged to project above the member, said restraining means having a locking surface for engaging and urging an element slidable in said guide into wedging relationship with the flanges, and releasing means including a cam surface movable transversely of the direction of movement of said restraining means for urging said element out of wedging relation.

3. In a support for a camera, or the like, a table-like member, flanges on said member converging toward one end of the member and having overhanging edges to form a guide, restraining means including a spring-pressed pin adapted to project from said member and having a locking surface for engaging an element slidable in said guide and urging said element into wedging relation with the flanges, and cam means rotatably mounted on said member adjacent said one end for releasing said element from wedging relation.

4. In a support for a camera, or the like, a table-like member, flanges on said member converging toward one end of the member and having overhanging edges to form a guide for slidably receiving an element having spaced abutments thereon, means movably mounted on said member having oppositely directed surfaces between which said abutments are positioned for optional engagement by said surfaces, movement of said surfaces respectively into engagement with said abutments serving to urge said element toward or away from said end to move said element into and out of wedging relation with said flanges.

5. In a support for a camera, or the like: a table-like member; flanges fixed to said member and converging toward one end of said member to form a guide; a plate adapted to be secured to a camera, or the like, and having converging flanges engageable with the flanges of said member; and means mounted on said member and engageable with an edge of said plate to urge said plate toward said one end, said means being movable into and out of operative position.

6. In a support for a camera, or the like: a table-like member; flanges fixed to said member and converging toward one end of said member to form a guide; a plate adapted to be secured to a camera, or the like, and having converging flanges engageable with the flanges of said member; a projection having a cam surface extending above said member for engagement with an edge of said plate to urge said plate toward said end; means mounting said projection on said member for movement with respect thereto; and means biasing said projection toward operative position with said plate.

ARTHUR E. REEVES.

REFERENCES CITED

The following references are of record in the file of this patent:

UNITED STATES PATENTS

| Number | Name | Date |
| --- | --- | --- |
| 962,844 | Kaufman | June 28, 1910 |
| 1,252,207 | Walker | Jan. 1, 1918 |
| 1,339,357 | Kopriva | May 4, 1920 |
| 1,451,382 | Wescott | Apr. 10, 1923 |
| 1,624,096 | Garbutt | Apr. 12, 1927 |
| 1,786,029 | Phillips | Dec. 23, 1930 |
| 2,351,386 | Zucker | June 13, 1944 |
| 2,375,690 | Reeves | May 8, 1945 |

FOREIGN PATENTS

| Number | Country | Date |
| --- | --- | --- |
| 632,261 | France | Jan. 6, 1928 |